(12) United States Patent
Oono et al.

(10) Patent No.: US 6,211,852 B1
(45) Date of Patent: Apr. 3, 2001

(54) LIQUID CRYSTAL DISPLAY DEVICE

(75) Inventors: Hiroshi Oono, Kanagawa; Kazumi Nozaki, Saitama, both of (JP)

(73) Assignee: Calsonic Kansei Corporation, Saitama (JP)

( * ) Notice: Subject to any disclaimer, the term of this patent is extended or adjusted under 35 U.S.C. 154(b) by 0 days.

(21) Appl. No.: 09/086,536

(22) Filed: May 29, 1998

(30) Foreign Application Priority Data

May 29, 1997 (JP) .................................................. 9-140695

(51) Int. Cl.$^7$ ........................................................ G09G 3/36
(52) U.S. Cl. .............................. 345/102; 345/101; 345/84
(58) Field of Search .................................. 345/77, 84, 102, 345/101, 89, 87, 211, 214, 204; 349/72, 61

(56) References Cited

U.S. PATENT DOCUMENTS 5,428,265 * 6/1995 Booth, Jr. et al. ...................... 315/158
5,489,918 * 2/1996 Mosier ..................................... 345/89
5,648,755 * 7/1997 Yagihashi ............................... 340/439

FOREIGN PATENT DOCUMENTS 56-128618   2/1955   (JP) .

* cited by examiner

*Primary Examiner*—Vijay Shankar
*Assistant Examiner*—Mansour M. Said
(74) *Attorney, Agent, or Firm*—Sughrue, Mion, Zinn, Macpeak & Seas, PLLC

(57) ABSTRACT

In a liquid crystal display device, when the detected signal produced from a temperature sensor is not higher than an indicating disabling temperature of an LCD element, a controller supplies a high luminance signal to a dimmer circuit to raise a voltage to be applied to a light source, and on-off controls a driving signal within a much shorter time than the response time of the LCD element.

16 Claims, 5 Drawing Sheets

Tx: INDICATION DISABLING TEMP.

LIQUID CRYSTAL DISPLAY DEVICE

BACKGROUND OF THE INVENTION

1. Field of the Invention

The present invention relates to a liquid crystal display device which is used, for example, as a vehicle meter for indicating a speed or number of revolutions.

2. Description of the Related Art

A liquid crystal display device (hereinafter referred to as "LCD" device for brevity), which should be used as a vehicle display device, must operate at a temperature ranging from −30° C. to 85° C. taking an environment around a vehicle into consideration. However, regarding the temperature characteristic of liquid crystal, the response of the liquid crystal is very poor at a low temperature. FIG. 7 is a characteristic graph showing a relationship between a temperature and the response speed of an LCD element. As seen from the graph, with respect to the response speed (or time) of the LCD element, both the rising time tr and dropping time td thereof increase at a low temperature. FIGS. 8A to 8C are response waveforms showing the response characteristic of the LCD element at room temperature and a low temperature. FIG. 8A shows an LCD driving waveform; FIG. 8B shows a response waveform of the LCD element at room temperature; and FIG. 8C shows a response waveform of the LCD element at a low temperature. In FIGS. 8A to 8C, time interval tch1 denotes an indication updating time in a 7-segment display having a "θ" shape capable of indicating digits of 0–9 in which "on" and "off" of each segment are synchronized with one another to update the indication for each time interval.

As seen from FIGS. 8A to 8C, at room temperature, the sum of the rising time tr and dropping time td is shorter than the indication updating time tch1 of the LCD driving waveform (FIG. 8A). On the other hand, at a lower temperature, the former is longer than the latter (FIG. 8C). Therefore, when the driving waveform is shifted from "OFF" to "ON", it becomes "OFF" before the light transmissivity of the LCD element reaches 90%. Also, when the driving waveform is shifted from "ON" to "OFF", it becomes "ON" before the light transmissivity of the LCD element reaches 10%. Thus, at the low temperature, on the moving picture of a speed meter, rotation meter, television, etc., in which the indication contents change at a high speed, a previous image and a subsequent image are mixedly displayed, thereby making an indication disabling state.

An exemplary means for solving such a problem is disclosed in Japanese U. M. 56-128618. In this prior art, the temperature of an LCD element, which is detected by a temperature detecting circuit, is forcibly elevated by a heater such as a heating wire at a low temperature so that it is early elevated to a normal operating temperature.

The prior art, which is constructed as described above, requires a heater such a heating wire and hence has problems of an increase in cost and weight and limitation of layout due to large-scaling.

SUMMARY OF THE INVENTION

The present invention has been made to solve the above problems, and therefore an object of the invention is to provide a liquid crystal display (LCD) device capable of improving poor response of an LCD element at a low temperature and not requiring a heater such as a heating wire.

To achieve the above object, according to the present invention, there is provided a liquid crystal display device characterized in that when the detected signal produced from said temperature sensor is not higher than an indication disabling temperature of the liquid crystal display (LCD) element, the controller supplies a high luminance signal to the dimmer circuit to boost a voltage to be applied to the light; source, and on-off controls the driving signal within a time shorter than the response time of the liquid crystal display element.

BRIEF DESCRIPTION OF THE DRAWINGS

FIGS. 8A to 8C are response waveforms showing the response characteristic of LCD element at room temperature and low temperature, in which FIG. 8A shows an LCD driving waveform, FIG. 8B shows a response waveform of an LCD element at room temperature, and FIG. 8C shows a response waveform of the LCD element at a low temperature.

DETAILED DESCRIPTION OF THE PREFERRED EMBODIMENTS

An explanation will be given of an embodiment of the present invention.

Figure 1:
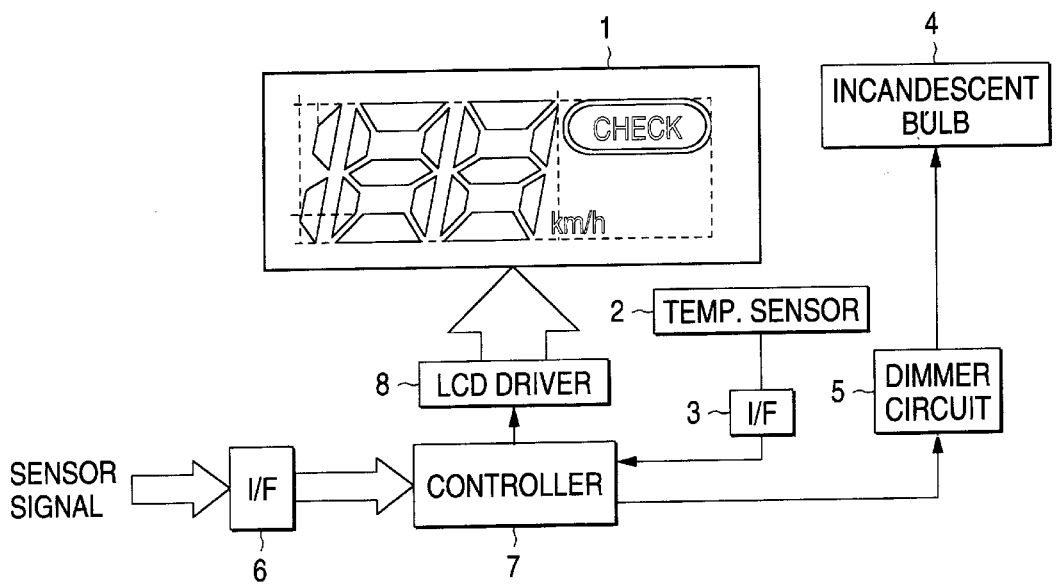
FIG. 1 is a block diagram showing an arrangement of an LCD device according to the present invention.

FIG. 1 is a block diagram showing the structure of a liquid crystal display device according to the present invention. In FIG. 1, reference numeral 1 denotes a liquid crystal display element (LCD element) for giving information such as a vehicle speed, number of revolutions. The LCD element includes a speed indicating section (speed meter) and a check (CHECK) indicating section which make the indications of the speed and CHECK, respectively. Reference numeral 2 denotes a temperature sensor for detecting the temperature of the LCD element 1. Reference numeral 3 denotes an interface section for converting the voltage level of an output signal from the temperature sensor 2 into a detected signal to be supplied to a controller. Reference numeral 4 denotes an incandescent bulb (light source) serving as a backlight source arranged behind the LCD element 1. Reference numeral 5 denotes a dimmer (or light-adjusting) circuit for controlling the incandescent bulb 4 in order to the indication brightness of the LCD element 1. Reference numeral 6 denotes an interface for converting the format of a signal produced from the vehicle speed sensor, etc. into an external input signal to be supplied to the controller 7.

Reference numeral 7 denotes a controller for controlling the LCD element 1 and the incandescent lamp 4. The controller 7 supplies a driving signal for driving/controlling the LCD element 1 in accordance with the external input signal to an LCD driver 8. In order to adjust the indication brightness of the LCD element 1, the controller 7 also supplies a light-adjusting control signal for duty-controlling a voltage to be applied to the incandescent bulb 4 in accordance with the external input signal from the interface 6 and the detected signal from the interface 3. Reference numeral 8 denotes the LCD driver for driving the LCD element 1 on the basis of the driving signal form the controller 7.

An explanation will be given of the operation of the LCD device.

Figure 7:
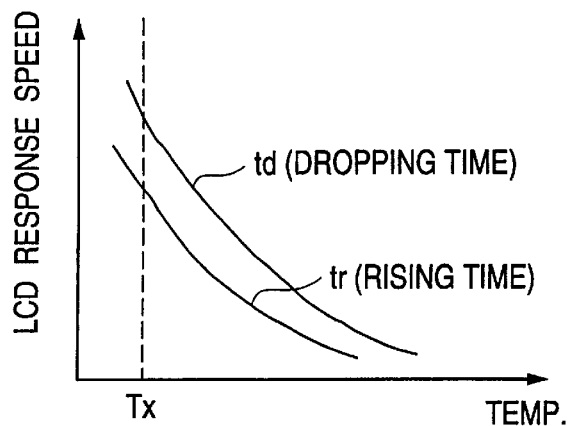
FIG. 7 is a characteristic graph showing a relation between a temperature and the response speed of an LCD element.
Figure 8A:
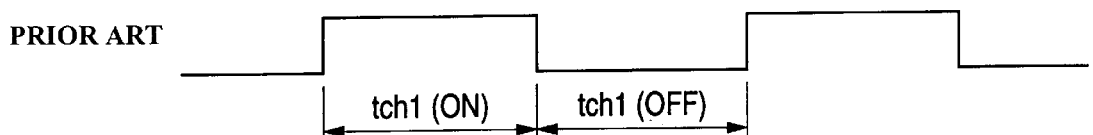
Figure 8B:
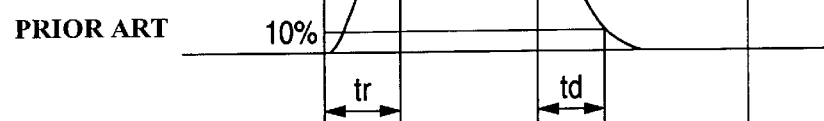
Figure 8C:
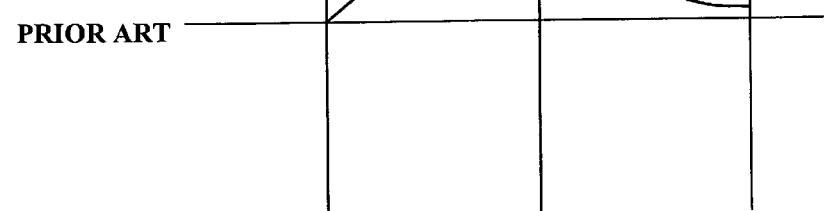

As described above, as shown in FIG. 7, the temperature characteristic of the LCD element 1 is such that its response time increases as the temperature of the LCD element 1 lowers so that the rising time tr and dropping time td increase. When the temperature of the LCD element 1 lowers to a temperature Tx (indication disabling temperature) where the sum of the rising time tr and dropping time td is longer than the normal indication updating time tch1, the updated indication cannot be recognized (because the displays before and after the updating are mixed). For example, assuming that the indication updating time tch1 is 400 msec, when the total of the rising time tr and dropping time td exceeds 400 msec, the indication disabling state results. In order to avoid such a state, the following operation is taken. The temperature of the LCD element 1 is detected by the temperature sensor 2. Then, when the detected signal indicative of the temperature not higher than the indication disabling temperature Tx is supplied from the interface 3 to the controller 7, the controller 7 starts to control warm air (warming up) to supply a high luminance signal to the dimmer circuit 5. Thus, a voltage to be applied to the incandescent bulb 4 is boosted. In this case, the amount of the hot rays (infrared rays) generated by the incandescent bulb 4, i.e. heating value is increased so that the temperature of the LCD element 1 is raised. Incidentally, the voltage to be applied to the incandescent bulb 4 is adjusted by changing the duty ratio so that the maximum luminance is obtained.

Additionally, while the warm air (warming-up) control of the LCD device is active, the indication of CHECK remains "ON". This informs a viewer of that the LCD element is under the control of warm air (warming-up) and the speed indication is disabled. Then, the indication of the speed is "OFF".

Figure 2:
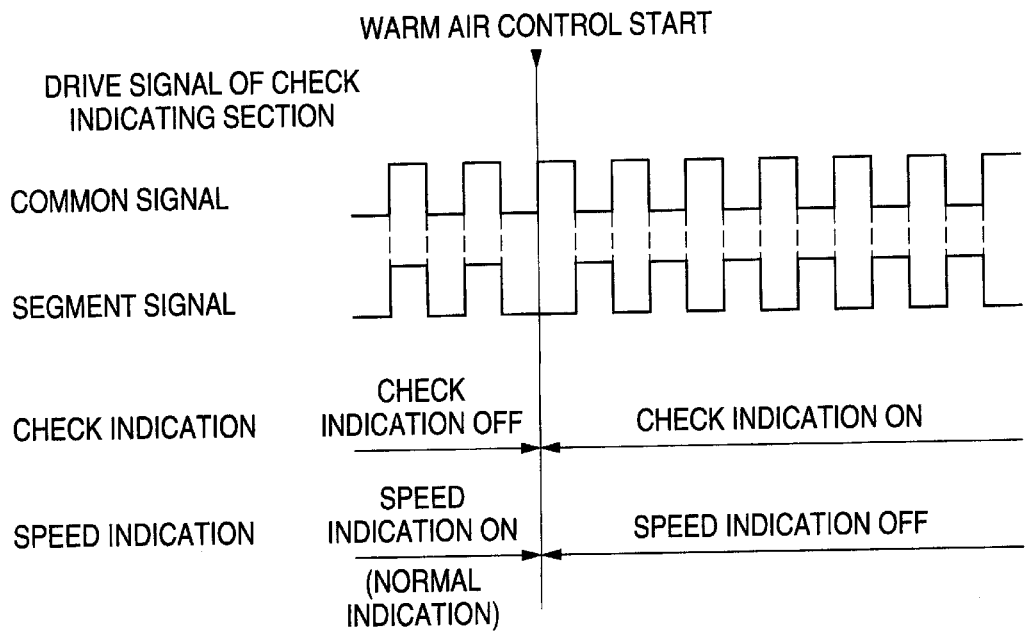
FIG. 2 is a view showing a LCD driving waveform for explaining the technical idea of the present invention.

FIG. 2 is a view showing the LCD driving waveform con the CHECK indicating section. In FIG. 2, a common signal denotes a voltage signal applied to the common electrode of the LCD element 1; a segment signal denotes a voltage signal applied to the segment electrode of the LCD element and is under static driving. As a result that the temperature of the LCD element 1 is raised, when the response speed of the LCD element 1 returns to a normal state, the indication of CHECK disappears (OFF) and the that of speed returns to the normal indication (ON). The indication of CHECK, when abnormality of the vehicle is detected at room temperature, turns "ON".

In this way, since the incandescent bulb 4 raises the temperature of the LCD element 1, the heater such as a heating wire is not required. This solves problems of an increase in cost and weight and limitation of layout due to large-scaling.

However, only boosting the voltage applied to the incandescent bulb 4 cannot give a more preferable result. Specifically, in the nature of the incandescent bulb, since the hot wire (infrared rays) and light rays are in a direct proportional relation to the applying voltage, the indication luminance of the LCD element 1 increases. This leads to an abnormally bright indication for the brightness of the indication (CHECK indication) to be controlled. Thus, the viewer is dazzled by the abnormal brightness, thus deteriorating the indication quality.

In order to solve such a problem, it is proposed that the driving signal of the LCD element 1 is turned ON or OFF within a sufficiently shorter time than the response time (tr+td) of the LCD element 1.

More specifically, the configuration of the LCD device is the same as that described in connection with FIG. 1. The LCD device is returned to the normal display state by raising the temperature of the LCD element 1 by the incandescent bulb without using the heater such as the heating wire.

Figure 3:
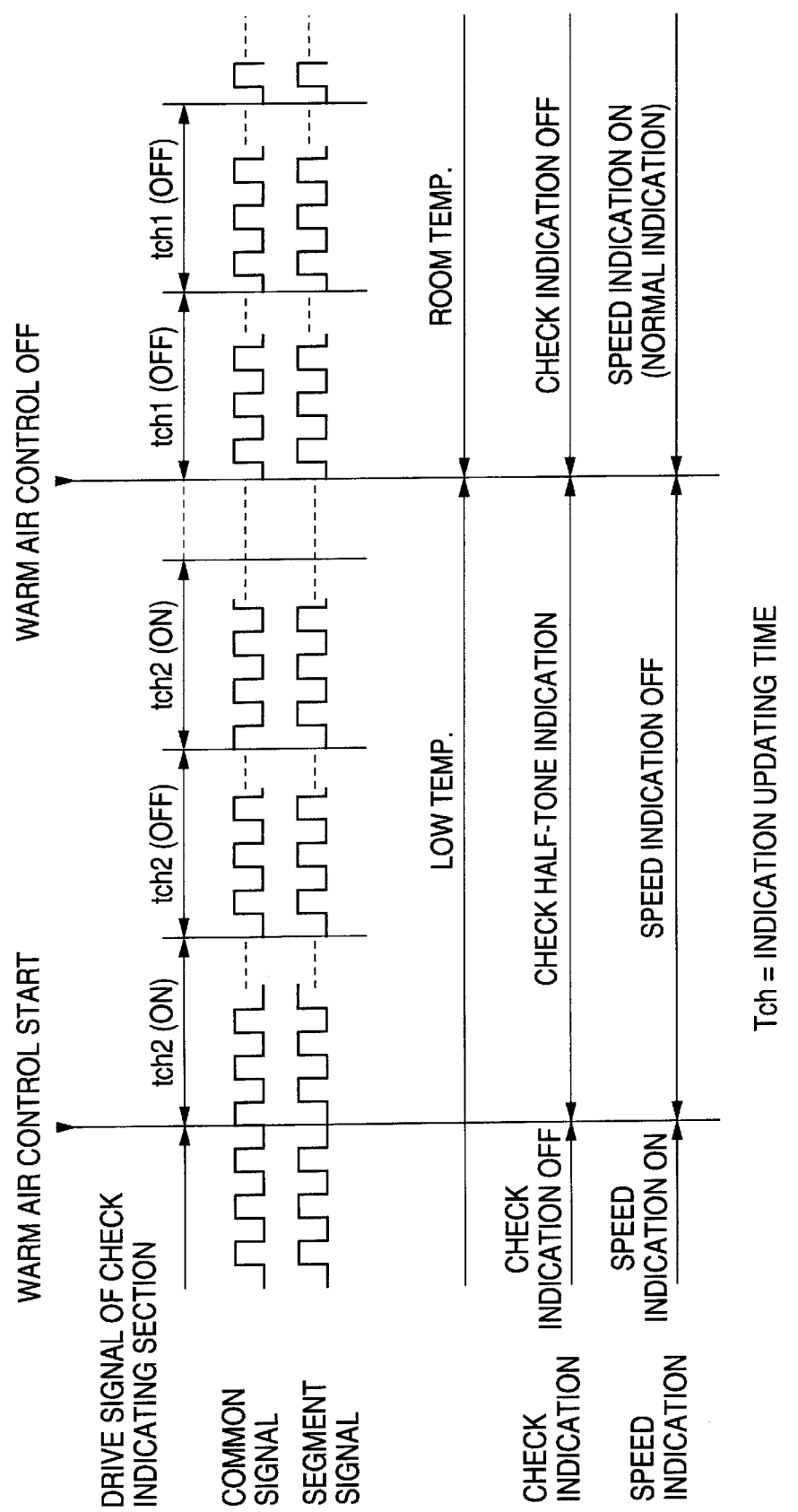
FIG. 3 is a view showing an LCD driving waveform for explaining the LCD according to the present invention.

FIG. 3 is a view showing an LCD driving waveform for explaining the LCD according to the present invention. This driving waveform is that on the CHECK indicating section. As described above, the CHECK indicating section is lit for indication only while the LCD device makes the control of warm air (warming up) and when abnormality of the vehicle is detected. In operation, the temperature of the LCD display element 1 is detected by the temperature sensor 2. Then, when the detected signal indicative of the temperature not higher than the indication disabling temperature Tx is supplied from the interface 3 to the controller 7, the controller 7 starts to control warm air (warming up) to supply a high luminance signal to the dimmer circuit 5. Thus, a voltage to be applied to the incandescent bulb 4 is boosted. In this case, the amount of the hot rays (infrared rays) generated by the incandescent bulb 4, i.e. heating value is increased so that the temperature of the LCD element 1 is boosted. Incidentally, the voltage to be applied to the incandescent bulb 4 is adjusted so that the maximum luminance is obtained.

Now, in order to prevent the indication luminance of the LCD element 1 from becoming too high, the driving signal of the LCD element 1 is turned ON/OFF at a higher speed than the response speed of the LCD element 1. Namely, the ON/OFF for the driving signal is repeated at a shorter time than the indication updating time tch1 described above, e.g. tch2 (satisfying inequality (tr+td)/100>tch2) which is sufficiently shorter than the response time tr+td of the LCD element 1. Concretely, assuming that the response time tr+td of the LCD element 1 is 400 msec, the indication updating time tch2 is set at about 18 msec. Normally, during tch2 (ON), a voltage is applied to the LCD element 1 so that light is transmitted to make the indication, and during tch2 (OFF), light is cut off so that the LCD element 1 appears black. However, assuming that the indication updating time tch2 (ON) and tch2 (OFF) is much shorter than tr+td, even if a voltage is applied during tch 2 (ON), light is not completely transmitted, and also during tch2 (OFF), the light is not completely cut off. This is because the LCD element 1 does not follow the indication updating time which is very short. Thus, when ON/OFF of the driving signal is repeated at the period of the indication updating time tch2, the LCD element 1 is placed in a stationary state between the excited state and declined state. In this stationary state, the light is not completely transmitted and cut off, thus giving the indication with low transmissivity. Therefore, even when the voltage to be applied to the incandescent bulb 4 is boosted to provide the maximum luminance, the indication luminance of the LCD element can be reduced to about half of the maximum luminance.

Figure 4:
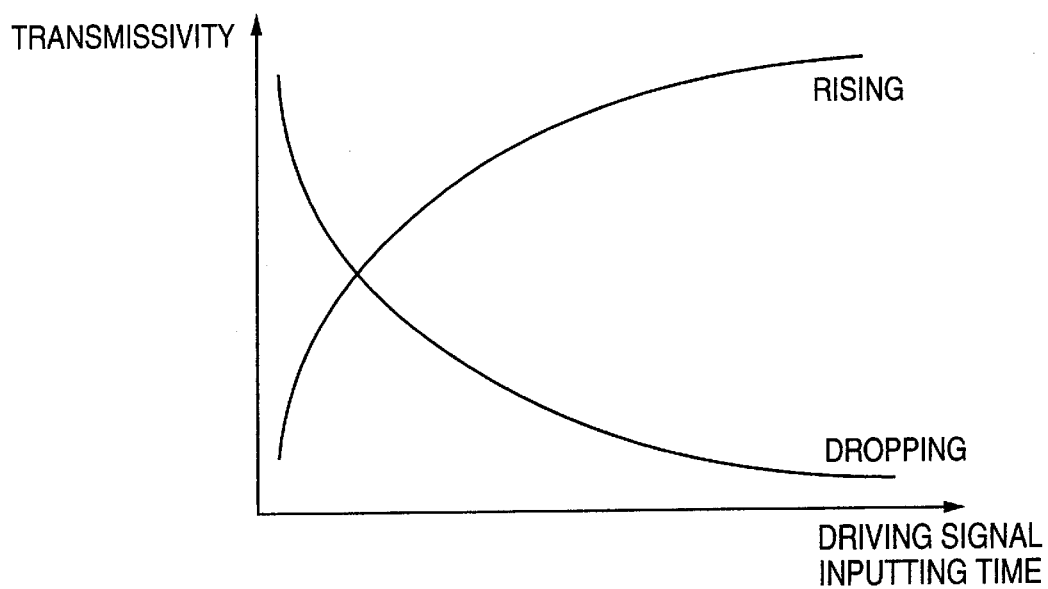
FIG. 4 is a graph showing the relationship between transmissivity and a driving signal inputting time.
Figure 5:
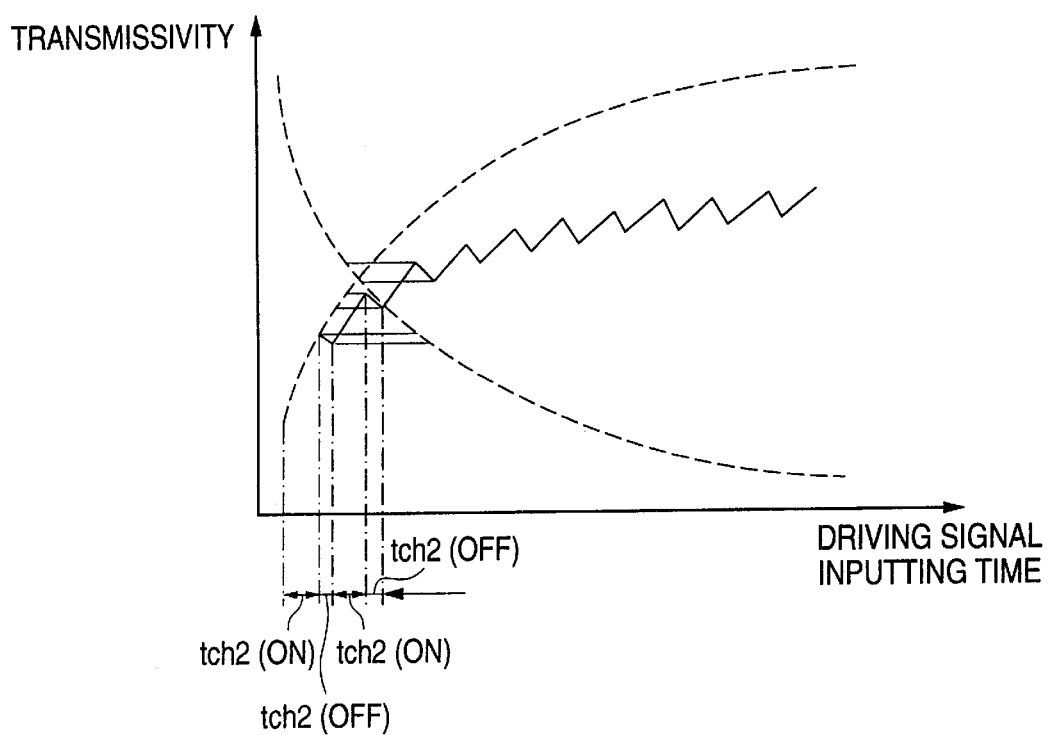
FIG. 5 is a graph showing the driving state of the LCD element according to the present invention at a low temperature.
Figure 6:
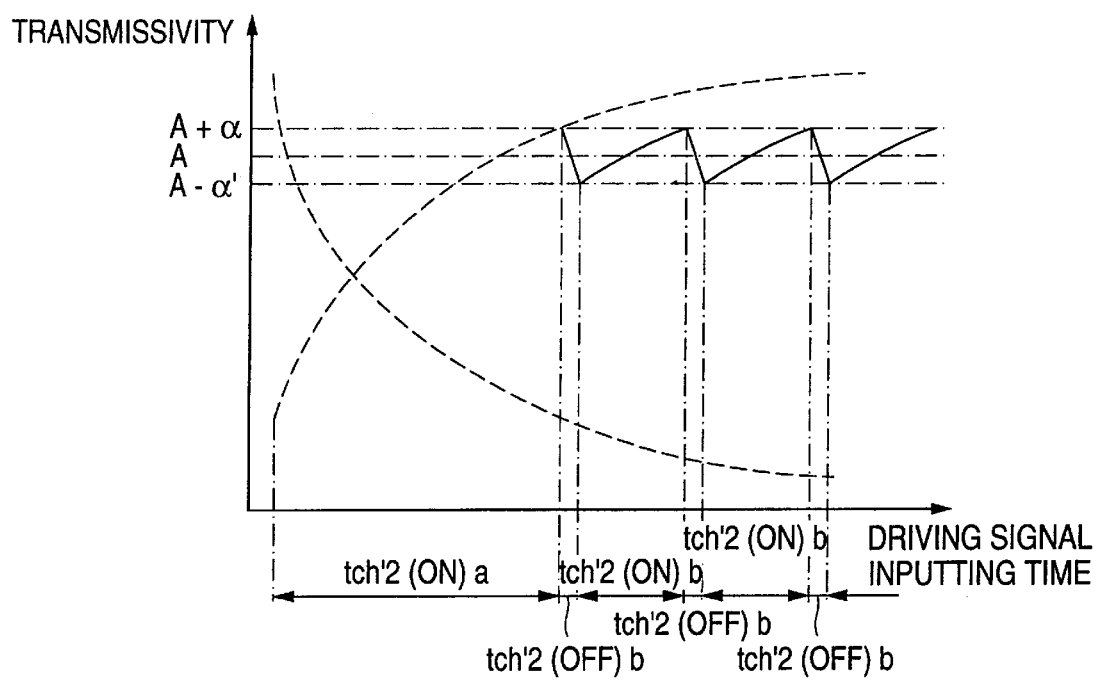
FIG. 6 is a graph for explaining the method for setting transmissivity.

Referring to FIGS. 4–6, the indication updating time tch2 (ON) and tch2 (OFF) will be explained in detail. FIG. 4 is a graph showing the relationship between transmissivity and a driving signal inputting time (at a constant temperature). As seen from FIG. 4, the response characteristic differs between the rise of transmissivity in the LCD element 1 when the driving signal is applied and the drop of transmissivity thereof when supply of the driving signal is stopped. In view of this fact, while tch2 (ON) and tch2 (OFF) are set at the same period in the previous embodiment, in this embodiment, the driving signal inputting time (indication updating time) is finely controlled so that the transmissivity of the LCD element risen at tch2 is not lowered at tch2. This leads to more swift arrival to a target transmissivity.

FIG. 5 is a graph showing the driving state of the LCD device according to the present invention at a low temperature. In FIG. 5, the characteristic shown in FIG. 4 is also shown by broken lines. As seen from FIG. 5, the driving signal is supplied during tch2 so that the LCD element 1 is actuated to raise the transmissivity. Subsequently, during tch2 (OFF), the driving signal is stopped so that the transmissivity lowers from the raised point of transmissivity. The transmissivity rises again from the lowered point of transmissivity for the time of tch2 (ON). The ON/OFF control for the driving signal is repeated to drive the LCD element 1.

In this case, the periods of tch2 (ON) and tch2 (OFF) are set so that the rise of transmissivity during tch2 (ON) is not larger than the drop (in this embodiment, at least, tch2 (ON)>tch2 (OFF)). Thus, the transmissivity after tch2 (OFF) does not become lower than the initial transmissivity during tch2 (ON). The transmissivity gradually increases in a zigzag fashion, and eventually converges in a certain point. As a result, the LCD element 1 is displayed in a halftone.

FIG. 6 is a view for explaining the setting of transmissivity based on the setting of tch2 (ON) and tch2 (OFF), and shows the driving state at a low temperature like FIG. 5. In FIG. 6, symbol A denotes a target transmissivity. In operation, the driving signal is supplied until the transmissivity reaches A+a (period of tch'2(ON)a). Thereafter, in order to obtain the target transmissivity A, the driving signal is repeatedly ON/OFF controlled in such a manner that the transmissivity is lowered from A+α from A−α' for a dropping period tch'2 (OFF)b and is raised from A−α' to A+α (ON)b. Therefore, with a desired transmissivity set optionally, the luminance in a halftone indication of the LCD element can be controlled.

Incidentally, while the LCD element 1 is under the control of warm air (warming up), the indication of CHECK is made with a halftone and the indication of speed remains OFF. When the response speed of the LCD element 1 returns to the normal state as a result that the temperature of the LCD element 1 is raised, the indication updating time is also returned to tch1 so that the indication of CHECK disappears (OFF) and only when the abnormality signal of the vehicle is detected by the controller 7, the indication of CHECK is lit. Then, the speed indication is also returned to the normal indication (ON).

As described above, in accordance with the present invention, the temperature of the LCD element 1 is raised by the incandescent bulb 4 so that the poor response of the LCD element 1 at a low temperature can be improved and the heater such as a heating wire is not required. Thus, the present invention is not subjected to limitations of an increase in cost and weight and limitation of layout due to large-scaling. In addition, in accordance with the present invention, while the control of warm air (warming up) is active, the driving signal is ON/OFF controlled at a much shorter time than the response time of the LCD element 1. Thus, the indication luminance of the LCD element 1 is prevented from becoming too high.

In the above description, a configuration was explained in which only the CHECK indicating section which is a fixed is lit and ON/OFF-controlled within a much shorter time than the response time of the LCD element. The embodiment of the present invention should not be limited to such a configuration, but can be applicable to the indicating section which is movable.

As described above, according to the invention, when the detected signal produced from the temperature sensor is not higher than an indication disabling temperature of the LCD element, the controller supplies a high luminance signal to the dimmer circuit to boost a voltage to be applied to the light source, and on-off controls the driving signal within a much shorter time than the response time of the LCD element. Because of such a configuration, the poor response of the LCD element at a low temperature can be improved and the heater such as a heating wire is not required. Thus, the present invention is not subjected to limitations of an increase in cost and weight and limitation of layout due to large-scaling. In addition, the indication luminance of the LCD element is prevented from becoming too high.

What is claimed is:

1. A liquid crystal display device, comprising:
   a liquid crystal display element for indicating information for a viewer;
   a temperature sensor for detecting a temperature of the liquid crystal display element to produce a detected signal;
   a light source for illuminating said liquid crystal display element;
   a dimmer circuit for said light source for adjusting brightness of indication of said liquid crystal display element; and
   a controller for supplying a driving signal to said liquid crystal display element in accordance with an external input signal and for supplying to said dimmer circuit, a control signal for controlling said light source, in accordance with said external input signal and said detected signal;
   wherein when said detected signal produced from said temperature sensor is not higher than an indication disabling temperature of said liquid crystal display element, said controller supplies a high luminance signal to said dimmer circuit to enhance an application voltage to said light source, and on-off controls said driving signal within a time shorter than the response time of said liquid crystal display element.

2. A liquid crystal display device as claimed in claim 1, wherein said liquid crystal display element comprises a speed meter section and a check indicating section.

3. A liquid crystal display device as claimed in claim 1, wherein a light source comprises an incandescent bulb.

4. A liquid crystal display device as claimed in claim 1, wherein said light source is arranged behind said liquid crystal display element.

5. A liquid crystal display device, comprising:
   a liquid crystal display element that provides information to a viewer;
   a temperature sensor that detects a temperature of the liquid crystal display element and outputs a corresponding detected signal;
   a light source that illuminates the liquid crystal display element with light;

a light adjusting circuit that adjusts a brightness of the light provided by the light source; and a controller that at least indirectly generates a driving signal corresponding to an external input signal and generates a control signal corresponding to the detected signal output from the temperature sensor, wherein the driving signal drives the liquid crystal display element by selectively increasing and decreasing a transmissivity of the liquid crystal display element to selectively increase and decrease an amount of the light from the light source that passes through the liquid crystal display element, wherein, when the detected signal from said temperature sensor indicates that the temperature of the liquid crystal display element is less than a predetermined temperature, the controller outputs the control signal to instruct the light adjusting circuit to increase the brightness of the light from the light source to heat the liquid crystal display element, and wherein the light supplied from the light source is a primary heating source for the liquid crystal display element.

6. The liquid crystal display device as claimed in claim 5, wherein the transmissivity of the liquid crystal display element is increased when the driving signal has a first value and is decreased when the driving signal has a second value, and wherein, when the detected signal from said temperature sensor indicates that the temperature of the liquid crystal display element is less than the predetermined temperature, the controller changes a value of the driving signal between the first value and second value at a frequency corresponding to a period that is shorter than a response time of the liquid crystal display element.

7. The liquid crystal display device as claimed in claim 6, wherein a time period between a transition of the driving signal from the first value to the second value and a subsequent transition of the driving signal from the second value to the first value is less than a sum of a rising time and a falling time of the liquid crystal display element, wherein the rising time is a time required for the liquid crystal display element to rise from a first predetermined transmissivity value to a second predetermined transmissivity value, and wherein the falling time is a time required for the liquid crystal display element to fall from the second predetermined transmissivity value to the first predetermined transmissivity value.

8. The liquid crystal display device as claimed in claim 6, wherein a time period between a transition of the driving signal from the second value to the first value and a subsequent transition of the driving signal from the first value to the second value is less than a sum of a rising time and a falling time of the liquid crystal display element, wherein the rising time is a time required for the liquid crystal display element to rise from a first predetermined transmissivity value to a second predetermined transmissivity value, and wherein the falling time is a time required for the liquid crystal display element to fall from the second predetermined transmissivity value to the first predetermined transmissivity value.

9. The liquid crystal display element as claimed in claim 6, wherein the driving signal drives a first portion of the liquid crystal display element in which a message is display to the viewer indicating to the viewer that a display accuracy of a second portion of the liquid crystal display element being improved when the temperature of the liquid crystal display is less than the predetermined temperature.

10. The liquid crystal display element as claimed in claim 9, wherein the controller controls a transmissivity of the second portion of the liquid crystal display such that a substantial amount of the light from the light source does not pass through the second portion when the temperature of the liquid crystal display is less than the predetermined temperature.

11. A liquid crystal display device, comprising:

a liquid crystal display element that provides information to a viewer;

a temperature sensor that detects a temperature of the liquid crystal display element and outputs a corresponding detected signal;

a light source that illuminates the liquid crystal display element with light;

a light adjusting circuit that adjusts a brightness of the light provided by the light source; and a controller that at least indirectly generates a driving signal corresponding to an external input signal and generates a control signal corresponding to the detected signal output from the temperature sensor, wherein the driving signal drives the liquid crystal display element by selectively increasing and decreasing a transmissivity of the liquid crystal display element to selectively increase and decrease an amount of the light from the light source that passes through the liquid crystal display element, wherein, when the detected signal from said temperature sensor indicates that the temperature of the liquid crystal display element is less than a predetermined temperature, the controller outputs the control signal to instruct the light adjusting circuit to increase the brightness of the light from the light source to heat the liquid crystal display element, wherein the transmissivity of the liquid crystal display element is increased when the driving signal has a first value and is decreased when the driving signal has a second value, and wherein, when the detected signal from said temperature sensor indicates that the temperature of the liquid crystal display element is less than the predetermined temperature, the controller changes a value of the driving signal between the first value and second value at a frequency corresponding to a period that is shorter than a response time of the liquid crystal display element.

12. The liquid crystal display device as claimed in claim 11, wherein a time period between a transition of the driving signal from the first value to the second value and a subsequent transition of the driving signal from the second value to the first value is less than a sum of a rising time and a falling time of the liquid crystal display element, wherein the rising time is a time required for the liquid crystal display element to rise from a first predetermined transmissivity value to a second predetermined transmissivity value, and wherein the falling time is a time required for the liquid crystal display element to fall from the second predetermined transmissivity value to the first predetermined transmissivity value.

13. The liquid crystal display device as claimed in claim 11, wherein a time period between a transition of the driving signal from the second value to the first value and a subsequent transition of the driving signal from the first value to the second value is less than a sum of a rising time and a falling time of the liquid crystal display element, wherein the rising time is a time required for the liquid crystal display element to rise from a first predetermined transmissivity value to a second predetermined transmissivity value, and wherein the falling time is a time required for the liquid crystal display element to fall from the second predetermined transmissivity value to the first predetermined transmissivity value.

14. The liquid crystal display element as claimed in claim 11, wherein the driving signal drives a first portion of the liquid crystal display element in which a message is display to the viewer indicating to the viewer that a display accuracy of a second portion of the liquid crystal display element being improved when the temperature of the liquid crystal display is less than the predetermined temperature.

15. The liquid crystal display element as claimed in claim 14, wherein the controller controls a transmissivity of the second portion of the liquid crystal display such that a substantial amount of the light from the light source does not pass through the second portion when the temperature of the liquid crystal display is less than the predetermined temperature.

16. The liquid crystal display element as claimed in claim 15, wherein the light supplied from the light source is a primary heating source for the liquid crystal display element.

* * * * *